United States Patent
Zhang et al.

(10) Patent No.: US 12,112,183 B2
(45) Date of Patent: Oct. 8, 2024

(54) METHOD AND APPARATUS FOR CONTENTION WINDOW SIZE ADJUSTMENT

(71) Applicant: LENOVO (BEIJING) LIMITED, Beijing (CN)

(72) Inventors: Yu Zhang, Beijing (CN); Haipeng Lei, Beijing (CN); Alexander Golitschek Edler Von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 658 days.

(21) Appl. No.: 17/431,083

(22) PCT Filed: Feb. 15, 2019

(86) PCT No.: PCT/CN2019/075298
§ 371 (c)(1),
(2) Date: Aug. 13, 2021

(87) PCT Pub. No.: WO2020/164157
PCT Pub. Date: Aug. 20, 2020

(65) Prior Publication Data
US 2022/0129286 A1   Apr. 28, 2022

(51) Int. Cl.
*G06F 9/355* (2018.01)
*G06F 9/451* (2018.01)

(52) U.S. Cl.
CPC ............ *G06F 9/452* (2018.02); *G06F 9/3555* (2013.01)

(58) Field of Classification Search
CPC ....... G06F 9/452; G06F 9/3555; H04L 1/1896
See application file for complete search history.

(56) References Cited

U.S. PATENT DOCUMENTS

| 2017/0005768 | A1 | 1/2017 | Yin et al. |
| 2017/0041957 | A1* | 2/2017 | Pazhyannur ............ H04L 1/203 |
| 2019/0082429 | A1* | 3/2019 | Xiao .................... H04B 7/0617 |

FOREIGN PATENT DOCUMENTS

| CN | 108781467 A | 11/2018 |
| CN | 109314615 A | 2/2019 |

(Continued)

OTHER PUBLICATIONS

International Searching Authority, "Written Opinion of the International Searching Authority," PCT/CN2019/075298, Nov. 7, 2019, pp. 1-3.

*Primary Examiner* — Charles N Appiah
*Assistant Examiner* — Frank E Donado
(74) *Attorney, Agent, or Firm* — Kunzler Bean & Adamson

(57) ABSTRACT

Methods and apparatus for contention window size adjustment are described. A method includes: receiving a first group of feedback signals indicating a first state corresponding to data transmitted in a first band used by a carrier, the first group of feedback signals comprising at least one first feedback signal; receiving a second group of feedback signals indicating a second state corresponding to data transmitted in the first band used by the carrier; determining a first scaling factor α for one of the at least one first feedback signal; determining a ratio of the first group of feedback signals to the first group of feedback signals and the second group of feedback signals; and comparing the ratio to a threshold to determine a contention window size (CWS) of the first band, wherein the first scaling factor α substitutes a weight of the one of the at least one first feedback signal in determination of the ratio of the first group of feedback signals to the first group of feedback signals and the second group of feedback signals.

19 Claims, 8 Drawing Sheets

(56) References Cited

FOREIGN PATENT DOCUMENTS

| | | | | | |
|---|---|---|---|---|---|
| CN | 107251420 B | * | 1/2021 | ............. | G06F 17/14 |
| EP | 3297192 A1 | | 3/2018 | | |
| WO | 2017166222 A1 | | 10/2017 | | |

* cited by examiner

| UE | Transmission data type | Feedback Signal |
|---|---|---|
| UE0 | CBG0 | ACK |
| | CBG2 | ACK |
| | CBG3 | NACK |
| UE1 | TB | NACK |
| UE2 | TB | ACK |
| UE3 | TB | NACK |
| UE4 | CBG0 | NACK |

FIG. 3

METHOD AND APPARATUS FOR CONTENTION WINDOW SIZE ADJUSTMENT

TECHNICAL FIELD

The subject application generally relates to a wireless communication system, and more particularly, to a method and apparatus for contention window size adjustment in the wireless communication system.

BACKGROUND

Congestion control is used to reduce or avoid collision in a wireless network. Techniques used to perform congestion control may include management of contention window size (CWS). Adjustment of the CWS may depend on various parameters. However, some techniques for adjusting CWS may not reflect a state of a carrier or a channel where data is to be accessed from and may unintentionally cause a collision or reduction of network throughput.

SUMMARY OF THE DISCLOSURE

In accordance with some embodiments of the subject application, a method includes receiving a first group of feedback signals indicating a first state corresponding to data transmitted in a first frequency band used by a carrier, the first group of feedback signals comprising at least one first feedback signal; receiving a second group of feedback signals indicating a second state corresponding to data transmitted in the first frequency band used by the carrier; determining a first scaling factor $\alpha$ for one of the at least one first feedback signal; determining a ratio of the first group of feedback signals to the first group of feedback signals and the second group of feedback signals; and comparing the ratio to a threshold to determine a contention window size (CWS) of the first frequency band, wherein the first scaling factor $\alpha$ substitutes a weight of the one of the at least one first feedback signal in determination of the ratio of the first group of feedback signals to the first group of feedback signals and the second group of feedback signals.

In accordance with some embodiments of the subject application, an apparatus includes at least one processor; and at least one memory including computer program code; the at least one memory and the computer program code configured to, with at least one processor, cause the apparatus at least to perform the above method.

BRIEF DESCRIPTION OF THE DRAWINGS

In order to describe the manner in which advantages and features of the disclosure can be obtained, a description of the disclosure is rendered by reference to specific embodiments thereof, which are illustrated in the appended drawings. These drawings depict only example embodiments of the disclosure and are not therefore to be considered limiting of its scope.

FIG. 3 illustrates a table of feedback information from user equipment (UE) in accordance with some embodiments of the subject application;

DETAILED DESCRIPTION

Figure 1:
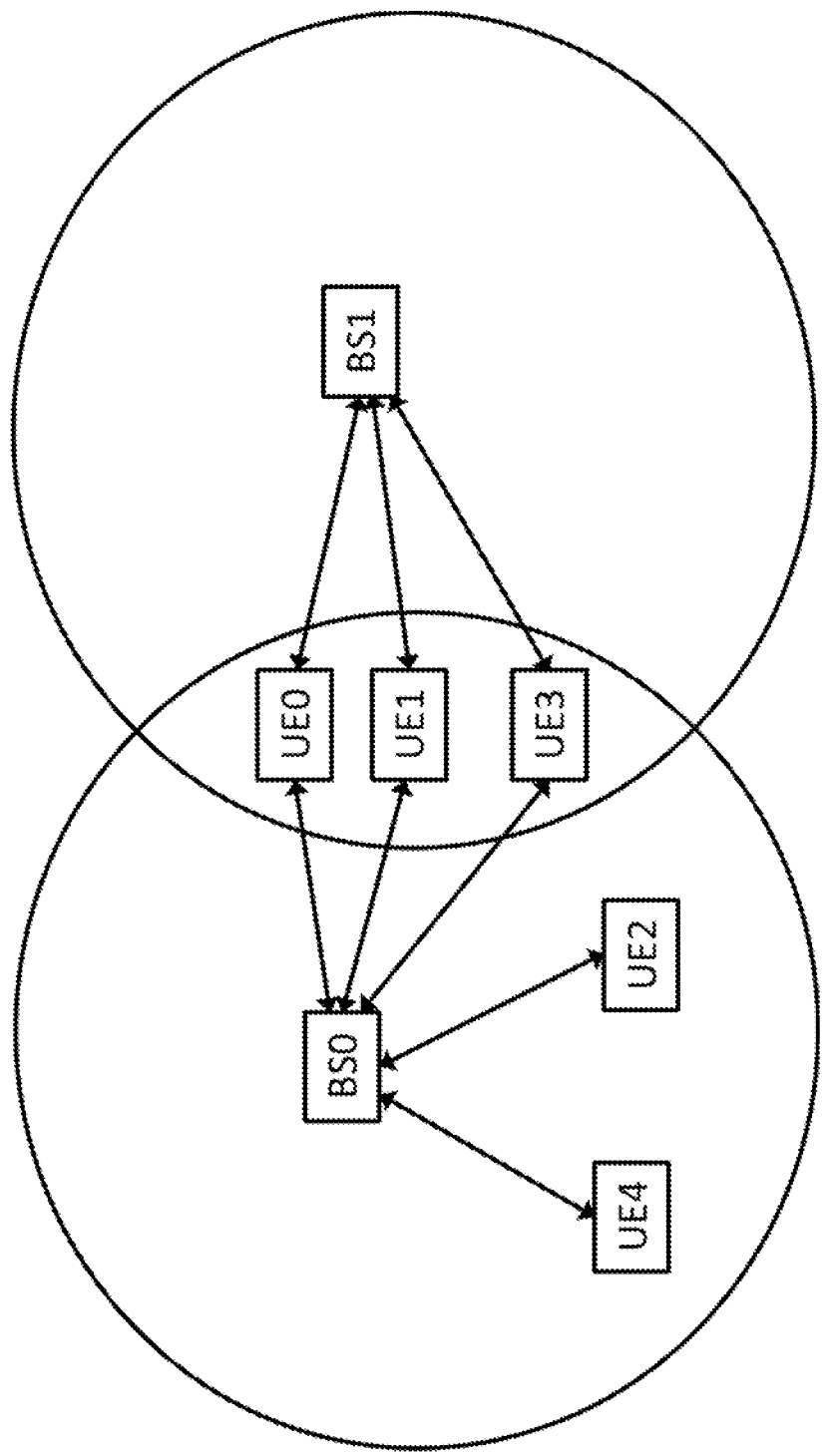
FIG. 1 illustrates a wireless network in accordance with some embodiments of the subject application.

The detailed description of the appended drawings is intended as a description of preferred embodiments of the present disclosure, and is not intended to represent the only form in which the present disclosure may be practiced. It should be understood that the same or equivalent functions may be accomplished by different embodiments that are intended to be encompassed within the spirit and scope of the present disclosure.

Listen Before Talk (LBT) or sometimes Listen Before Transmit (LBT) or clear channel assessment (CCA) is a channel access technique, and used for transmission on an unlicensed spectrum. In order to achieve fair coexistence with other wireless systems, LBT operation is required before a transmitter (e.g., a base station (BS)) can start the transmission on an unlicensed spectrum. LBT operation is executed by performing energy detection on a certain channel. If the detected power of the channel is below a pre-defined threshold, LBT is determined as successful, which suggests that the channel is deemed as empty and available for transmission. Only when LBT operation is determined as successful, can the transmitter start the transmission on the channel and occupy the channel up to the maximum channel occupancy time (MCOT). Otherwise, if the detected power of the channel exceeds a predefined threshold, LBT operation is determined failed. Accordingly, the transmitter cannot start the transmission and will continue performing LBT operation until a successful LBT operation is performed.

The contention window is applied in LBT Category 4, where a random back-off counter is generated within the contention window. Wherein the contention window is not limited to be used in LBT Category 4. The contention window corresponds to a priority class. The contention window size at the transmitter side is adjusted based on HARQ (Hybrid Automatic Repeat reQuest)-ACK (Acknowledgement) feedback from the receiver side (e.g., a user equipment (UE)). For example, if at least 80% of the HARQ-ACK feedback values for a reference slot set are NACK, the contention window size is doubled; otherwise, the contention window size is reset to the minimum value.

Regarding HARQ-ACK feedback, TB (Transport Block)-based retransmission is supported in NR (New Radio) for HARQ-ACK feedback signals. For the TB-based retransmission, one HARQ-ACK feedback bit corresponds to one TB. As long as one code block (CB) of a given TB is not correctly decoded at the receiver side, the receiver side will report a "Negative-Acknowledgement (NACK)" corresponding to the given TB to the transmitter side, and the transmitter side has to retransmit all the CBs of the given TB. Assuming one HARQ-ACK feedback bit corresponds to one CB, the transmitter side can be aware of the decoding state of each transmitted CBG, so it can only retransmit the failed CB(s). Thus, the retransmission efficiency is higher than the TB-based retransmission. However, the HARQ-ACK feedback overhead may be huge.

In order to balance the number of the HARQ-ACK feedback bits and the retransmission efficiency, the concept of CBG (Code Block Group) is introduced and the CBG-based retransmission is also supported in NR. Basically, the intention of CBG is to group several CBs into one CBG so that HARQ-ACK feedback can be generated per CBG. Only all the CBs within one CBG are correctly decoded, the receiver side may send "ACK" for the CBG to the transmitter side. Otherwise, the receiver side may send "NACK" for the CBG to the transmitter side. After receiving the HARQ-ACK feedback, the transmitter side can only retransmit the CBG(s) with "NACK".

For the CBG-based retransmission, the maximum number of CBGs per TB may be configured by a radio resource control (RRC) signalling. For example, the maximum number of CBGs per TB may be 2, 4, 6 and 8. For both semi-static HARQ-ACK codebook and dynamic HARQ-ACK codebook, the number of HARQ-ACK bits for one TB is equal to the configured maximum number of CBGs per TB, regardless of the variable TBS (Transport Block Size) of a given TB.

FIG. 1 illustrates a wireless network 1 in accordance with some embodiments of the subject application.

Referring to FIG. 1, the wireless network 1 includes a base station BS0, base station BS1, user equipment UE0, user equipment UE1, user equipment UE2, user equipment UE3, and user equipment UE4. Although merely two base stations (e.g. BS0 and BS1) are illustrated in FIG. 1 for simplicity, it is contemplated that wireless network 1 may include more or less base station(s). Although merely five user equipment (e.g. UE0, UE1, UE2, UE3 and UE4) are illustrated in FIG. 1 for simplicity, it is contemplated that wireless communication system 1 may include more or less UE(s).

BS 0 may operate, for example but is not limited to, in accordance with Long-Term Evolution (LTE), LTE-Advanced (LTE-A), LTE-Unlicensed (LTE-U), LTE Licensed Assisted Access (LTE LAA), New Radio (NR), NR-Unlicensed (NR-U), 3GPP, Wi-Fi, Wireless Gigabit (WiGig) or other suitable protocol(s). BS1 may operate in a manner same or similar to BS0. BS1 may operate in a manner different from BS0.

UE0 may include, for example but is not limited to, a computing device, a wearable device, a mobile device, an IoT device, a vehicle having at least a transceiver, etc. Each of UE1, UE2, UE3 and UE4 may be represented by or include a device same or similar to UE0. In addition, each of UE1, UE2, UE3 and UE4 may include or represent a device that is different from UE0. Persons skilled in the art should understand that as the technology develops and advances, the terminologies described in the present disclosure may change, and should not affect or limit principle and spirit in the present disclosure.

As shown in FIG. 1, UE0, UE1 and UE3 are within coverage of both BS0 and BS1, which means wireless connection may be established for data transmission to both or either base stations BS0 or BS1. For example, wireless connection or connection channel(s) between BS0 and UE0, between BS0 and UE1, between BS0 and UE3, between BS1 and UE0, between BS1 and UE 1, and between BS1 and UE3 may be established. In addition, UE2 and UE4 are within coverage of BS0 only with a wireless connection or connection channel(s) being established, for example, between BS0 and UE2 and between BS0 and UE4.

Figure 2A:
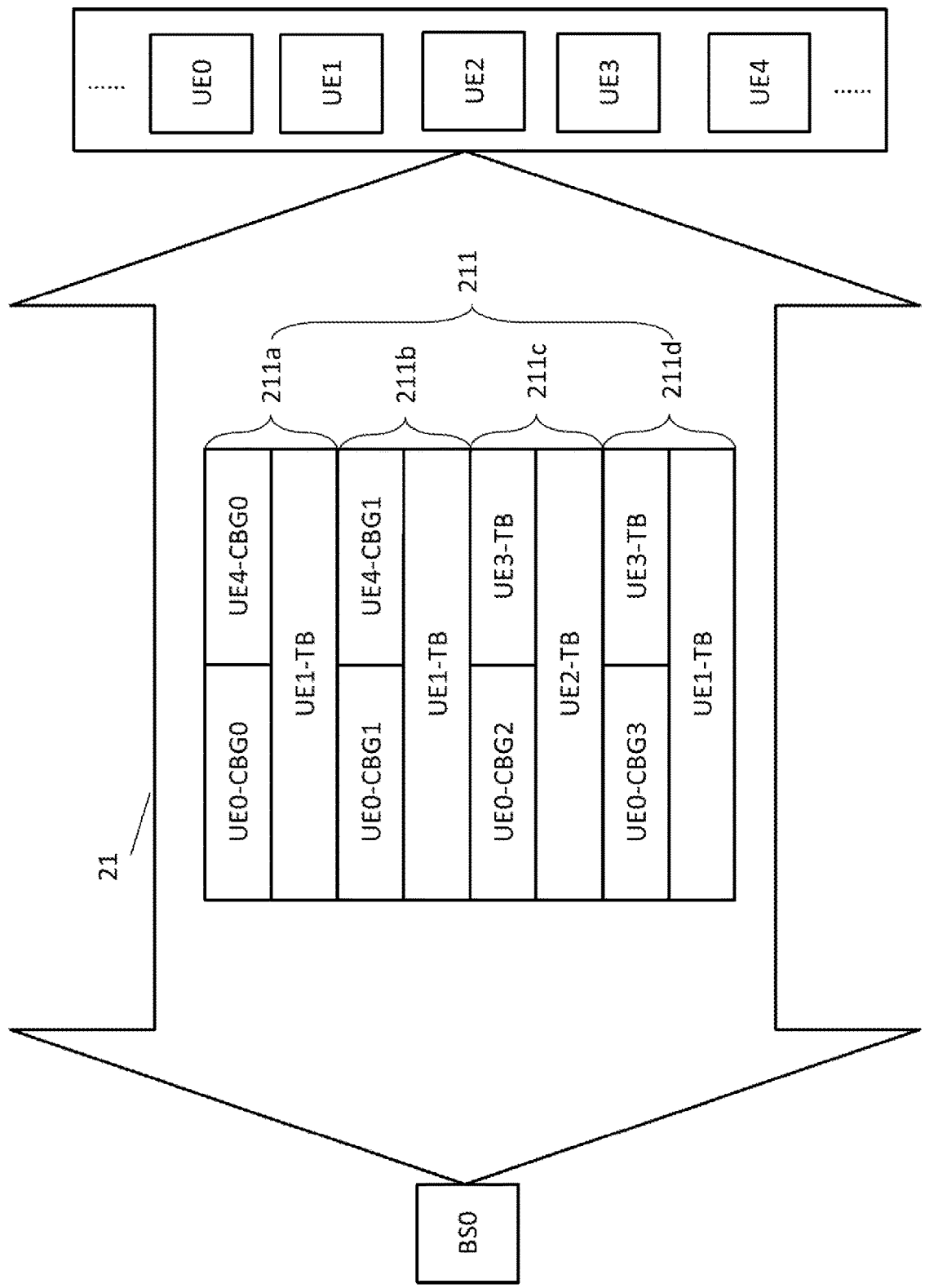
FIG. 2A illustrates a wireless connection in accordance with some embodiments of the subject application.

FIG. 2A illustrates a wireless connection in accordance with some embodiments of the subject application.

Referring to FIG. 2A, a wireless connection 2 is established between BS0 and UE0, UE1, UE2, UE3 and UE4 shown in FIG. 1. The wireless connection 2 may include various carriers or channels, for example represented in FIG. 2A by carrier 21. Although for simplicity reasons, merely a single carrier 21 is illustrated in FIG. 2A, it is contemplated that the wireless connection 2 may include more carriers. Carrier(s) 21 may be used for data transmission between BS0 and UE0. Carrier 21 may be used for data transmission between BS0 and UE1. Carrier 21 may be used for data transmission between BS0 and UE2. Carrier(s) 21 may be used for data transmission between BS0 and UE3. Carrier 21 may be used for data transmission between BS0 and UE4.

BS0 may transmit downlink (DL) data to UE1 in a form of transport block (TB) on carrier 21. BS0 may transmit downlink (DL) data to UE2 in a form of a transport block (TB) on carrier 21. BS0 may transmit downlink (DL) data to UE3 in a form of a transport block (TB) on carrier 21. BS0 may also transmit downlink (DL) data as part of code block group (CBG) or within the CBG on carrier 21. For example, BS0 may transmit downlink (DL) data to UE0 as part of CBG or within the CBG on carrier 21 or transmit downlink (DL) data to UE4 in a form of CBG on carrier 21.

A TB may be divided into various code blocks (CBs). Multiple CBs may be grouped or arranged to form a single CBG with TB including, as an example, multiple CBGs. In some examples, a CBG may include one CB, all CBs of a TB, or any number of CBs of a TB.

Carrier 21 may include a frequency band 211, which may be divided into four subbands 211a, 211b, 211c and 211d. It is contemplated that the frequency band 211 may be divided to include more or less subbands. Although it is not illustrated, it is contemplated that there may be more carrier(s) for data transmission between base station (e.g. BS0) and user equipment (e.g. UE0, UE1, UE2, UE3 or UE4).

For example, the frequency band 211 may have a bandwidth of approximately 80 Mega-Hertz (MHz). The frequency band 211 may be divided into four subbands 211a, 211b, 211c and 211d. Each of the subbands: 211a, 211b, 211c and 211d, may have a bandwidth of approximately 20 MHz. Although it is not illustrated, it is contemplated that frequency band 211 may be divided to include more or less subband(s). Although each of the subbands: 211a, 211b, 211c and 211d, may have a same bandwidth, it is also contemplated that the subbands may have a different bandwidth.

Subband 211a may be used for data transmission utilizing CBG0 between BS0 and UE0 (e.g., data or signal(s) UE0-CBG0). Subband 211a may be used for data transmission utilizing CBG0 between BS0 and UE4 (e.g., data or signal(s) UE4-CBG0). In addition, subband 211a may be used for data transmission between BS0 and UE1 (e.g., data or signal(s) UE1-TB).

Similarly, subband 211b may be used for data transmission utilizing CBG1 between BS0 and UE0 (e.g., data or signal(s) UE0-CBG1). Subband 211b may be used for data transmission utilizing CBG1 between BS0 and UE4 (e.g., data or signal(s) UE4-CBG1). Subband 211b may be used for data transmission between BS0 and UE1 (e.g., data or signal(s) UE1-TB).

Subband 211c may be used for data transmission utilizing CBG2 between BS0 and UE0 (e.g., data or signal(s) UE0-CBG2). Subband 211c may be used for data transmission between BS0 and UE3 (e.g., data or signal(s) UE3-TB).

Subband 211c may be used for data transmission between BS0 and UE2 (e.g., data or signal(s) UE2-TB).

Subband 211d may be used for data transmission using CBG3 between BS0 and UE0 (e.g., data or signal(s) UE0-CBG3). Subband 211d may be used for data transmission between BS0 and UE3 (e.g., data or signal(s) UE3-TB). Subband 211d may be used for data transmission between BS0 and UE1 (e.g., data or signal(s) UE1-TB).

According to FIG. 2A, data transmission between BS0 and UE0 may be performed via subband 211a, subband 211b, subband 211c and subband 211d. Data transmission between BS0 and UE1 may be performed via subband 211a, subband 211b and subband 211d. Data transmission between BS0 and UE2 may be performed via subband 211c. Data transmission between BS0 and UE3 may be performed via subband 211c and subband 211d. Data transmission between BS0 and UE4 may be performed via subband 211a and subband 211b. It is contemplated that data may be transmitted in a form other than TB or CBG. It is contemplated that configuration of the carrier 21, subband 211a, subband 211b, subband 211c or subband 211d may vary.

A Listen Before Talk (LBT) operation may be performed on each subband 211a, subband 211b, subband 211c and subband 211d prior to data transmission between BS0 and UE0, between BS0 and UE1, between BS0 and UE2, between BS0 and UE3, or between BS0 and UE4.

BS0 may be aware of a state of channel throughout the channel's duration. A channel is a single path provided by a transmission medium via spectral or protocol separation to transmit data, such as by frequency or time-division multiplexing. The channel may be a carrier, a frequency band, a subband, etc. During the channel's duration, BS0 may detect channel's power level which is then compared to a threshold to determine whether the LBT operation is successful or not. For example, if the detected power is higher than the threshold, which means the state of channel is busy, and the LBT operation is determined as failed, thus signaling that the channel is occupied. If the detected power is lower than the threshold, this means the state of channel is idle. If BS0 is aware of the state of the channel is idle, then BS0 determines a random back-off timer/counter to be used for BS0 itself or other user equipment(s) (e.g. UE0, UE1 or UE3) to wait for a random back-off duration or delay duration. If the channel is still idle subsequent to the random back-off duration expiring, then the LBT operation performed on the channel is determined as successful and the channel may be accessed by BS 0. The range of random back-off duration is also called a contention window (CW). For example, other BS(s) (e.g. BS1 as shown in FIG. 1) may access the same channel simultaneously, which will lead to cause a collision on the channel. In order to reduce the collision probability, adjustment of CW size (CWS) may be required.

Figure 2B:
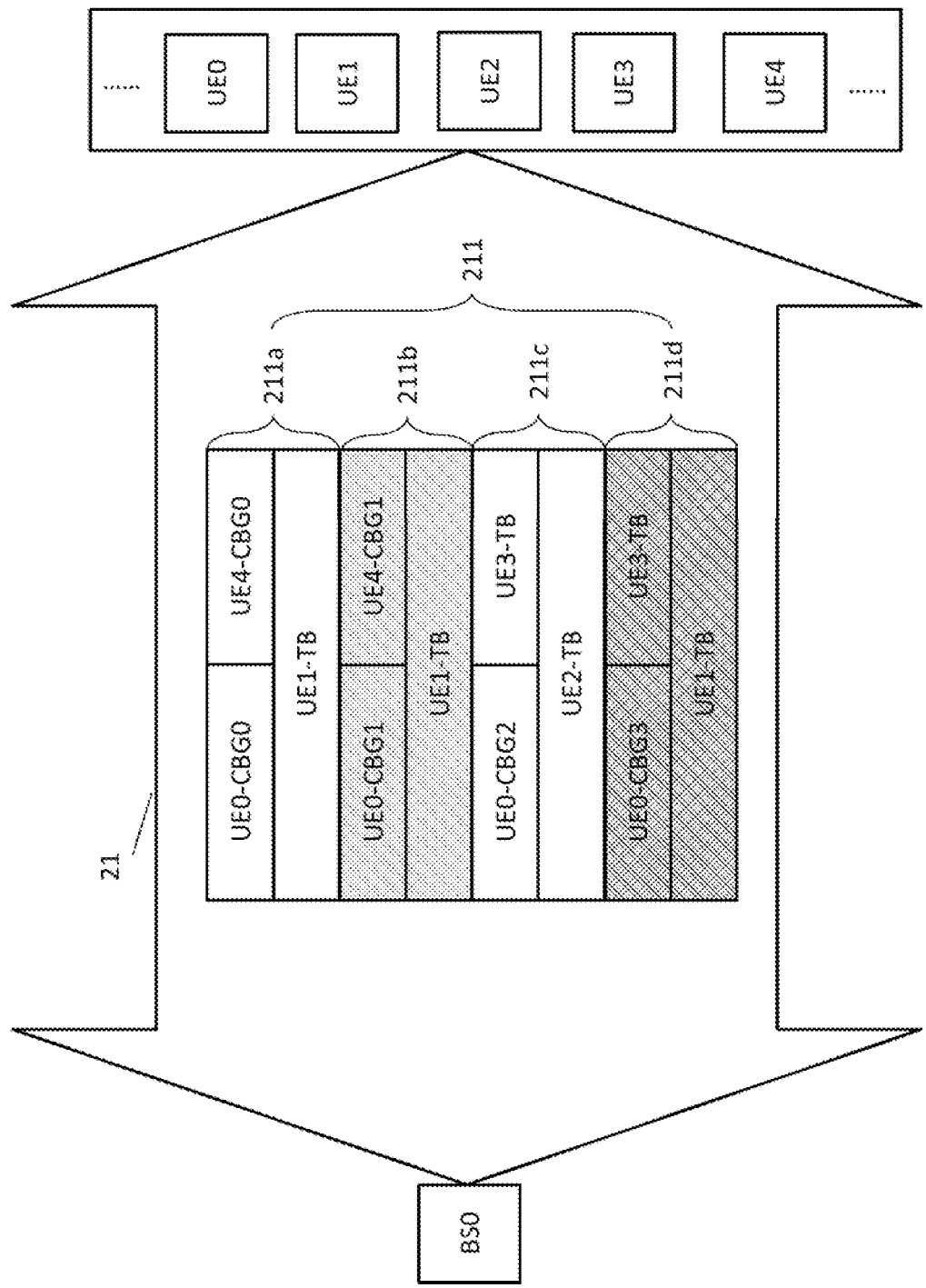
FIG. 2B illustrates another wireless connection in accordance with some embodiments of the subject application.

FIG. 2B illustrates another wireless connection 2 in accordance with some embodiments of the subject application.

Referring to FIG. 2B, no data will be transmitted by BS0 via subband 211b due to failed LBT operation on subband 211b. In other words, UE0, UE1 and UE4 cannot receive the transmission data via subband 211b. Accordingly, BS0 will not receive feedback signals from UE0, UE1 and UE4 regarding subband 211b. It is contemplated that the feedback signal may be a value or can be converted to a value, which can be used for calculation.

Referring back to FIG. 1, data for UE0, UE1 and UE3 scheduled for transmission on subband 211d is unsuccessful due to a collision as described above. In other words, UE0, UE1 and UE3 cannot receive transmission data via subband 211d. It is contemplated that UE may receive transmission data via other carrier(s) or subband(s).

Referring to FIG. 2B, BS0 may receive feedback signals corresponding to UE0-CBG0, UE1-TB and UE4-CBG0 transmitted via subband 211a. BS0 may receive feedback signals corresponding to UE0-CBG1, UE1-TB and UE4-CBG1 transmitted via subband 211b. BS0 may receive the feedback signals corresponding to UE0-CBG2, UE2-TB and UE3-TB transmitted via subband 211c. BS0 may also receive feedback signals corresponding to UE0-CBG3, UE1-TB and UE3-TB transmitted via subband 211d.

Referring back to FIG. 2B, after BS0 transmits data via subband(s) 211 to UE0, UE1, UE2, UE3 and UE4, each of UE0, UE1, UE2, UE3 and UE4 may send feedback signal(s) to BS0. It is contemplated that BS0 may also transmit data via other subbands used by carrier 21 or bands/subbands used by other carriers to UE0, UE1, UE2, UE3 and UE4. Whether the received transmission data from a BS is successfully decoded by an UE will be identified in a feedback signal(s) sent back to corresponding BS. For example, when the transmission data from BS is received and decoded successfully by an UE, a feedback signal may indicate an acknowledgement (ACK). On the other hand, when the transmitted data from a BS is unsuccessfully decoded by an UE, the feedback signal may indicate a negative acknowledgement (NACK).

FIG. 3 illustrates a table 3 of feedback information from UE in accordance with some embodiments of the subject application.

Referring to FIG. 3, if the transmission data of CBG 0 for UE0 via subband 211a from BS0 is successfully decoded, the feedback signal corresponding to UE0-CBG0 for UE0 indicates ACK. Similarly, if the transmission data of CBG 2 for UE0 via subband 211c from BS0 is successfully decoded by UE0, then the feedback signal corresponding to UE0-CBG2 for UE0 indicates ACK. Finally, the transmission data of CBG 3 for UE0 via subband 211d due to a collision on subband 211d between BS0 and BS1 is unsuccessfully decoded, the feedback signal corresponding to UE0-CBG3 for UE0 indicates NACK.

Due to a collision on subband 211d between BS0 and BS1 and a failed LBT on subband 211b, UE1 cannot receive the transmission data of TB for UE1 via subband 211b, and the transmission data of TB for UE1 via subband 211d is unsuccessfully decoded by UE1. The transmission data of TB for UE1 via subband 211a from BS 0 is also unsuccessfully decoded, the feedback signal corresponding to UE1-TB for UE1 indicates NACK.

The transmission data of TB for UE2 via subband 211c from BS0 is successfully decoded by UE2, the feedback signal corresponding to UE2-TB for UE2 indicates ACK.

Due to a collision on subband 211d between BS0 and BS1, the transmission data of TB for UE3 via subband 211d is unsuccessfully decoded by UE3. The transmission data of TB for UE3 via subband 211c is also unsuccessfully decoded by UE3, the feedback signal corresponding to UE3-TB for UE3 indicates NACK.

Due to a failed LBT on subband 211b, UE4 cannot receive the transmission data of CBG1 for UE4 via subband 211b, the transmission data of CBG0 for UE4 via subband 211a is also unsuccessfully decoded by UE4, the feedback signal corresponding to UE4-CBG0 for UE4 indicates NACK.

Figure 4A:
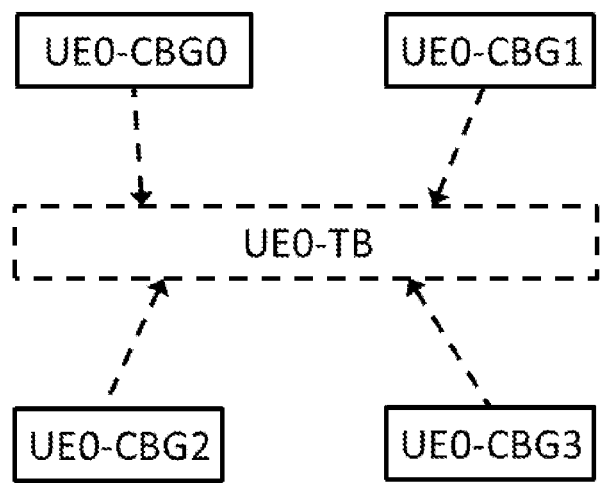
FIG. 4A illustrates a converting form of feedback signals regarding transport block (TB) in accordance with some embodiments of the subject application.

FIG. 4A illustrates a converting form 4A of feedback signals regarding TB in accordance with some embodiments of the subject application.

As shown in FIG. 4A, a feedback signal corresponding to data transmitted as part of CBG for UE0 may be determined or converted by feedback signals corresponding to UE0-CBG0, UE0-CBG1, UE0-CBG2 and UE0-CBG3. Referring back to FIG. 4A, the converted feedback signal based on feedback signals corresponding to UE0-CBG0, UE0-CBG1, UE0-CBG2 and UE0-CBG3 can be represented as a feedback signal corresponding to a virtual UE0-TB. It is contemplated that the feedback signal corresponding to the virtual UE0-TB may be determined by feedback signals corresponding to more or less CBG(s). It is contemplated that feedback signals corresponding to data transmitted as part of CBG for other UE(s) (e.g., UE4, etc.) may also be determined by feedback signals corresponding to more or less CBG(s).

For example, the feedback signal corresponding to the virtual UE0-TB may be determined by a ratio of feedback signal(s) indicating NACK. If the feedback signal corresponding to UE0-CBG0 indicates ACK, and the feedback signals corresponding to UE0-CBG1, UE0-CBG2, and UE0-CBG3 indicate NACK, then the ratio of feedback signals indicating NACK is 3/4. If the ratio 3/4 is greater than a predetermined threshold (e.g. 1/2), then the feedback signal corresponding to the virtual UE0-TB, which is converted from feedback signals corresponding to UE0-CBG0, UE0-CBG1, UE0-CBG2 and UE0-CBG3, is determined to indicate NACK. It is contemplated that the determination of whether the feedback signal corresponding to the virtual UE0-TB is indicated as ACK or NACK is not limited to the above.

Figure 4B:
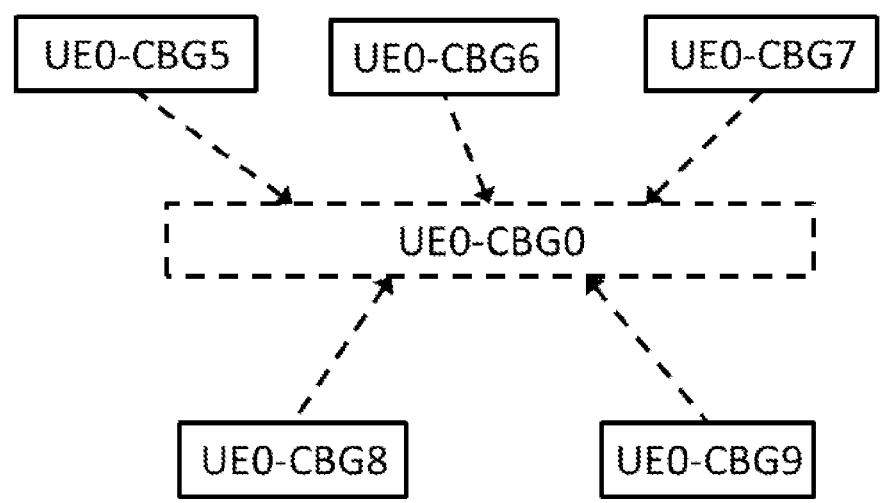
FIG. 4B illustrates a converting form of feedback signals regarding code block group (CBG) in accordance with some embodiments of the subject application.

FIG. 4B illustrates a converting form 4B of feedback signals regarding CBG in accordance with some embodiments of the subject application.

As shown in FIG. 4B, various feedback signals corresponding to various CBGs transmitted via a same subband may be converted to a feedback signal corresponding to a virtual single CBG. Referring back to FIG. 4B, the feedback signal corresponding to a CBG (e.g., UE0-CBG0) may be determined or converted by feedback signals corresponding to UE0-CBG5, UE0-CBG6, UE0-CBG7, UE0-CBG8 and UE0-CBG9 transmitted via subband 211a. It is contemplated that the feedback signal corresponding to UE0-CBG0 may be determined or converted by feedback signals corresponding to more or less CBG(s). It is contemplated that feedback signals corresponding to data transmitted as part of CBG for other UE(s) (e.g., UE4-CBG0 and UE4-CBG1 etc.) may also be determined by feedback signals corresponding to more or less CBG(s).

For example, the feedback signal corresponding to the UE0-CBG0 may be determined by a ratio of feedback signal(s) indicating NACK. If the feedback signal corresponding to UE0-CBG5 indicates ACK, and feedback signals corresponding to UE0-CBG6, UE0-CBG7, UE0-CBG8 and UE0-CBG9 indicate a NACK, then the ratio of feedback signals indicating NACK is 4/5. If the ratio 4/5 is greater than a predetermined threshold (e.g. 2/3), then the feedback signal corresponding to the UE0-CBG0, which is converted from feedback signals corresponding to UE0-CBG5, UE0-CBG6, UE0-CBG7, UE0-CBG8 and UE0-CBG9, is determined to indicate NACK. It is contemplated that the determination of whether the feedback signal corresponding to the UE0-CBG0 is indicated as ACK or NACK is not limited to the above.

Figure 5:
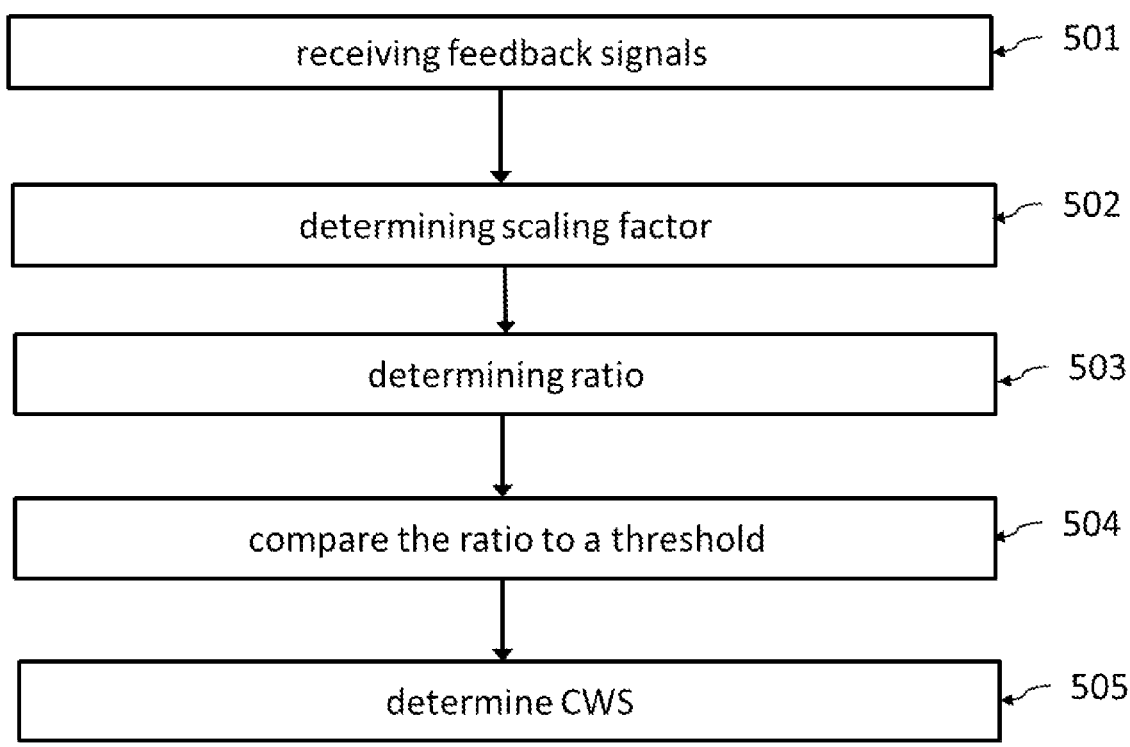
FIG. 5 illustrates a method of CWS adjustment in accordance with some embodiments of the subject application.

FIG. 5 illustrates a method 5 of CWS adjustment in accordance with some embodiments of the subject application. The method 5 may be used for CWS adjustment in the wireless network 1 as shown in FIG. 1. The method 5 may be used for CWS adjustment in a wireless connection as shown in FIG. 2B.

Referring to FIG. 5, in operation 501, BS0 may receive feedback signals corresponding to UE0-CBG2, UE3-TB and UE2-TB transmitted in subband 211c as shown in FIG. 2B.

The feedback signals corresponding to UE0-CBG2, UE3-TB and UE2-TB may include ACK signal(s) and NACK signal(s). The ACK signal(s) may indicate that data transmitted as part of TB or CBG was decoded successful. On the other hand, the NACK signal(s) may indicate a failure of decoding process for data transmitted as part of TB or CBG. In other words, BS0 may receive a group of ACK feedback signals. In other words, BS0 may receive a group of NACK feedback signals.

Referring back to FIG. 2B, BS0 may receive a group of feedback signals corresponding to UE0-CBG2 and UE2-TB indicating ACK and a feedback signal corresponding to UE3-TB indicating NACK.

In operation 502, if a feedback signal corresponding to data transmitted as part of TB (e.g. UE2-TB) indicates an ACK, BS0 determines the scaling factor α for the feedback signal corresponding to UE2-TB as one.

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE2-TB) is replaced by or substituted with the scaling factor α:

$$\frac{1}{1+1+\alpha} = \frac{1}{1+1+1} = \frac{1}{3} \quad (1)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211c.

Following the method steps described in connection with FIG. 5, as discussed above, the ratio which is determined by introducing the scaling factor α, may help BS0 to adjust the CWS to relatively precisely reflect real channel quality or state of subband 211c. Accordingly, collisions may be alleviated or mitigated. Moreover, throughput of the wireless network 1 of FIG. 1 may be improved in a relatively efficient way.

In accordance with other embodiments of the present application, referring to FIG. 5, in operation 501, BS0 may receive feedback signals corresponding to UE0-CBG2, UE3-TB and UE2-TB transmitted in subband 211c as shown in FIG. 2B.

The feedback signals corresponding to UE0-CBG2, UE3-TB and UE2-TB may include ACK signal(s) and NACK signal(s). The ACK signal(s) may indicate data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, BS0 may receive a group of feedback signals corresponding to UE0-CBG2 and UE2-TB indicating ACK and a feedback signal corresponding to UE3-TB indicating NACK.

In operation 502, if a feedback signal corresponding to data transmitted as a part of TB (e.g. UE2-TB) indicates an ACK, BS0 determines the scaling factor α for the feedback signal corresponding to UE2-TB as $$1 - \frac{\left\lfloor \frac{n-p-1}{q-1} \right\rfloor}{n-p}.$$

Wherein "n" is configured as the amount of subbands associated with the TB. Regarding UE2-TB, BS0 transmits UE2-TB via one subband 211c, and thus the number of subbands associated with UE2-TB is equal to 1, i.e., n is equal to 1.

"p" is configured as the amount of subband with failed LBT operation associated with the TB. Regarding UE2-TB, BS0 transmits UE2-TB via one subband 211c in FIG. 2B. There is no failed LBT operation performed on subband 211c, and thus the number of subbands with failed LBT associated with UE2-TB is equal to 0, i.e., p is equal to 0.

"q" is configured as a predetermined constant indicating the minimum number of subbands where there have been a collision on one or more subbands and the feedback signal corresponding to the TB is ACK, i.e., regarding UE2-TB, q is configured to be equal to 4.

The scaling factor α for the feedback signal corresponding to UE2-TB is equal to $$1 - \frac{\left\lfloor \frac{n-p-1}{q-1} \right\rfloor}{n-p} = 1 - \frac{\left\lfloor \frac{1-0-1}{4-1} \right\rfloor}{1-0} = 1 \quad (2)$$

In operation 503, assuming both the ACK feedback signal and the NACK feedback signal are given a weight of one, BS0 determines a ratio of NACK feedback signals based on the following, where the weight of a NACK feedback signal corresponding to a TB (e.g. UE2-TB) is replaced by or substituted with the scaling factor α:

$$\frac{1}{1+1+\alpha} = \frac{1}{1+1+\left(1-\frac{\left\lfloor \frac{n-p-1}{q-1} \right\rfloor}{n-p}\right)} = \frac{1}{1+1+\left(1-\frac{\left\lfloor \frac{1-0-1}{4-1} \right\rfloor}{1-0}\right)} = \frac{1}{3} \quad (3)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211c.

Following the method steps described in connection with FIG. 5 as discussed above, the ratio which is determined by introducing the scaling factor α, may help BS0 to adjust the CWS to relatively precisely reflect real channel quality or state for subband 211c. Accordingly, collisions may be alleviated or mitigated. Moreover, throughput of the wireless network 1 of FIG. 1 may be improved in a relatively efficient way.

In accordance with other embodiments of the present application, Referring to FIG. 5, in operation 501, BS0 may receive feedback signals corresponding to UE0-CBG0, UE4-CBG0 and UE1-TB transmitted in subband 211a as shown in FIG. 2B.

The feedback signals corresponding to UE0-CBG0, UE4-CBG0 and UE1-TB may include ACK signal(s) and NACK signal(s). The ACK signal(s) may indicate data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, BS0 may receive a feedback signal corresponding to UE0-CBG0 and a group of feedback signals corresponding to UE4-CBG0 and UE1-TB indicating NACK.

In operation 502, if a feedback signal corresponding to data transmitted as part of TB (e.g. UE1-TB) indicates a NACK and subband 211b with failed LBT operation is associated with UE1-TB, i.e., the amount p of subband with failed LBT operation associated with UE1-TB is equal to one, BS0 determines the scaling factor α for the feedback signal corresponding to UE1-TB as a constant σ.

"σ" indicates probability of collision on one subband and ranges from zero to one. The constant σ includes zero.

In operation 503, assuming both the ACK feedback signal and the NACK feedback signal is given a weight of one, BS0 determines a ratio of NACK feedback signals based on the following, where the weight of NACK feedback signal corresponding to a TB (e.g. UE1-TB) is replaced by or substituted with the scaling factor α:

$$\frac{1+\alpha}{1+1+\alpha} = \frac{1+\sigma}{1+1+\sigma} \quad (4)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211a.

Following the method steps described in connection with FIG. 5 as discussed above, the ratio which is determined by introducing the scaling factor α, may help BS0 to adjust the CWS to relatively precisely reflect real channel quality or state of subband 211a. Accordingly, collisions may be alleviated or mitigated. Moreover, throughput of the wireless network 1 of FIG. 1 may be improved in a relatively efficient way.

In accordance with other embodiments of the present application, referring to FIG. 5, in operation 501, BS0 may receive feedback signals corresponding to UE0-CBG2, UE3-TB and UE2-TB transmitted in subband 211c as shown in FIG. 2B.

The feedback signals corresponding to UE0-CBG2, UE3-TB and UE2-TB may include ACK signal(s) and NACK signal(s). The ACK signal(s) may indicate data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, BS0 may receive a group of feedback signals corresponding to UE0-CBG2 and UE2-TB indicating ACK and a feedback signal corresponding to UE3-TB indicating NACK.

In operation 502, if a feedback signal corresponding to data transmitted as part of TB (e.g. UE3-TB) indicates NACK and the amount p of subband with failed LBT operation associated with UE3-TB is equal to zero, BS0 determines the scaling factor α for the feedback signal corresponding to UE3-TB as $$\frac{\sigma}{1-(1-\sigma)^n}.$$

Wherein "n" is configured as the amount of subbands associated with the TB. Regarding UE3-TB, BS0 transmits UE3-TB via two subbands 211c and 211d, and thus the number of subbands associated with UE3-TB is equal to 2, i.e., n is equal to 2.

"σ" indicates probability of a collision on one subband, i.e., the constant σ ranges from zero to one. The scaling factor α for the feedback signal corresponding to UE3-TB is equal to $$\frac{\sigma}{1-(1-\sigma)^n}=\frac{\sigma}{1-(1-\sigma)^2}=\frac{1}{2-\sigma} \quad (5)$$

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE3-TB) is replaced by or substituted with the scaling factor α:

$$\frac{\alpha}{1+1+\alpha}=\frac{\frac{\sigma}{1-(1-\sigma)^n}}{1+1+\frac{\sigma}{1-(1-\sigma)^n}}=\frac{\frac{1}{2-\sigma}}{1+1+\frac{1}{2-\sigma}}=\frac{1}{5-2\sigma} \quad (6)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211c.

Following the method steps described in connection with FIG. 5 as discussed above, the ratio which is determined by introducing the scaling factor α, may help BS0 to adjust the CWS to relatively precisely reflect real channel quality or state of subband 211c. Accordingly, collision may be alleviated or mitigated. Moreover, throughput of the wireless network 1 may be improved in a relatively efficient way.

In accordance with other embodiments of the present application, Referring to FIG. 5, in operation 501, BS0 may receive feedback signals corresponding to UE0-CBG0, UE4-CBG0 and UE1-TB transmitted in subband 211a as shown in FIG. 2B.

The feedback signals corresponding to UE0-CBG0, UE4-CBG0 and UE1-TB may include ACK signal(s) and NACK signal(s). The ACK signal(s) may indicate data transmitted as part of TB or CBG is decoded successful. The NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, BS0 may receive a feedback signal corresponding to UE0-CBG0 indicating ACK and a group of feedback signals corresponding to UE1-TB and UE4-CBG0 indicating NACK.

In operation 502, subband 211b with failed LBT operation is associated with a feedback signals corresponding to data transmitted as part of TB (e.g., UE1-TB), i.e., the amount p of subband with failed LBT operation associated with UE1-TB is equal to one, BS 0 determines the scaling factor α for the feedback signal corresponding to UE1-TB as $$\frac{\gamma}{n-p}.$$

Wherein γ is a constant ranging from zero to one.

"n" is configured as the amount of subbands associated with UE1-TB, i.e., n is equal to 3.

"p" is configured as the amount of subband with failed LBT operation associated with UE1-TB, i.e., p is equal to 1.

In operation 503, assuming the ACK feedback signal is given a weight of zero and the NACK feedback signal is given a weight of one, BS0 determines a ratio of NACK feedback signals based on the following, where the weight of a NACK feedback signal corresponding to a TB (e.g. UE1-TB) is replaced by or substituted with the scaling factor α:

$$\frac{1+\alpha}{1+1+\alpha}=\frac{1+\frac{\gamma}{n-p}}{1+1+\frac{\gamma}{n-p}}=\frac{1+\frac{\gamma}{3-1}}{1+1+\frac{\gamma}{3-1}}=\frac{2+\gamma}{4+\gamma} \quad (7)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211a.

Following the method steps described in connection with FIG. 5 as discussed above, the ratio which is determined by introducing the scaling factor α, may help BS0 to adjust the CWS to relatively precisely reflect real channel quality or state for subband 211a. Accordingly, collisions may be alleviated or mitigated. Moreover, throughput of the wireless network 1 of FIG. 1 may be improved in a relatively efficient way.

In accordance with other embodiments of the present application, Referring to FIG. 5, in operation 501, BS0 may receive feedback signals corresponding to UE0-CBG0, UE4-CBG0 and UE1-TB transmitted in subband 211a as shown in FIG. 2B.

The feedback signals corresponding to UE0-CBG0, UE4-CBG0 and UE1-TB may include ACK signal(s) and NACK signal(s). The ACK signal(s) may indicate data transmitted as part of TB or CBG is decoded successful. The NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, BS0 may receive a feedback signal corresponding to UE0-CBG0 indicating ACK and a group of feedback signals corresponding to UE1-TB and UE4-CBG0 indicating NACK.

In operation 502, subband 211b with failed LBT operation is associated with a feedback signal corresponding to data transmitted as part of TB (e.g. UE1-TB), i.e., the amount p of subband with failed LBT operation associated with UE1-TB is equal to one, BS0 determines the scaling factor α for the feedback signal corresponding to UE1-TB as $$\frac{\gamma}{n-p}.$$

Wherein γ is determined based on a function of "n" and "p".

"n" is configured as the amount of subbands associated with UE1-TB, i.e., n is equal to 3.

"p" is configured as the amount of subband with failed LBT operation associated with UE1-TB, i.e., p is equal to 1.

In operation 503, assuming both the ACK feedback signal and the NACK feedback signal are given a weight of one, BS0 determines a ratio of NACK feedback signals based on the following, where the weight of NACK feedback signal corresponding to a TB (e.g. the feedback signal corresponding to UE1-TB) is replaced by or substituted with the scaling factor α:

$$\frac{1+\alpha}{1+1+\alpha} = \frac{1+\frac{\gamma}{n-p}}{1+1+\frac{\gamma}{n-p}} = \frac{1+\frac{\gamma}{3-1}}{1+1+\frac{\gamma}{3-1}} = \frac{2+\gamma}{4+\gamma} \quad (8)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211a.

By the method 5 as discussed above, the ratio which is determined by introducing the scaling factor α, may help BS0 to adjust the CWS to relatively precisely reflect real channel quality or state of subband 211a. Accordingly, collisions may be alleviated or mitigated. Moreover, throughput of the wireless network 1 may be improved in a relatively efficient way.

In accordance with other embodiments of the present application, referring to FIG. 5, in operation 501, BS0 may receive feedback signals corresponding to UE0-CBG2, UE3-TB and UE2-TB transmitted in subband 211c as shown in FIG. 2B.

The feedback signals corresponding to UE0-CBG2, UE3-TB and UE2-TB may include ACK signal(s) and NACK signal(s). The ACK signal(s) may indicate data transmitted as part of TB or CBG was decoded successful. The NACK signal(s) may indicate a failure of decoding process of data transmitted as part of TB or CBG. In other words, BS0 may receive a group of ACK feedback signals. In other words, BS 0 may receive a group of NACK feedback signals.

Referring back to FIG. 2B, BS0 may receive a group of feedback signals corresponding to UE0-CBG2 and UE2-TB indicating ACK and a feedback signal corresponding to UE3-TB indicating NACK.

In operation 502, the amount p of subband with failed LBT operation associated with a feedback signal corresponding to data transmitted as part of TB (e.g. UE3-TB) is equal to zero, BS0 determines the scaling factor α for the feedback signal corresponding to UE3-TB as $$\frac{1}{n}.$$

Wherein "n" is configured as the amount of subbands associated with the TB, i.e., regarding UE3-TB, n is equal to 2.

The scaling factor α for the feedback signal corresponding to UE3-TB is equal to $$\frac{1}{n} = \frac{1}{2} \quad (9)$$

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE3-TB) is replaced by or substituted with the scaling factor α:

$$\frac{\alpha}{1+1+\alpha} = \frac{\frac{1}{n}}{1+1+\frac{1}{n}} = \frac{\frac{1}{2}}{1+1+\frac{1}{2}} = \frac{1}{5} \quad (10)$$

In operation 504, BS 0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211c.

Following the method steps described in connection with FIG. 5 as discussed above, the ratio which is determined by introducing the scaling factor α, may help BS0 to adjust the CWS to relatively precisely reflect real channel quality or state of subband 211c. Accordingly, collision may be alleviated or mitigated. Moreover, throughput of the wireless network 1 of FIG. 1 may be improved in a relatively efficient way.

In accordance with other embodiments of the present application, referring to FIG. 5, in operation 501, BS0 may receive feedback signals corresponding to UE0-CBG2, UE3-TB and UE2-TB transmitted in subband 211c as shown in FIG. 2B.

The feedback signals corresponding to UE0-CBG2, UE3-TB and UE2-TB may include ACK signal(s) and NACK signal(s). The ACK signal(s) may indicate data transmitted as part of TB or CBG was decoded successful. The NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, BS0 may receive a group of feedback signals corresponding to UE0-CBG2 and UE2-TB indicating ACK and a feedback signal corresponding to UE3-TB indicating NACK.

In operation 502, the amount p of subband with failed LBT operation associated with a feedback signal corresponding to data transmitted as part of TB (e.g. UE2-TB) is equal to zero, BS0 determines the scaling factor α for the feedback signal corresponding to UE2-TB as $$\frac{1}{n}.$$

Wherein "n" is configured as the amount of subbands associated with the TB, i.e., regarding UE2-TB, n is equal to 1.

The scaling factor α for the feedback signal corresponding to UE2-TB is equal to $$\frac{1}{n} = \frac{1}{2} = 1 \tag{11}$$

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE2-TB) is replaced by or substituted with the scaling factor α:

$$\frac{1}{1+1+\alpha} = \frac{1}{1+1+\frac{1}{n}} = \frac{1}{1+1+\frac{1}{1}} = \frac{1}{3} \tag{12}$$

In operation 504, BS0 compares the NACK ratio to a threshold.

In operation 505, BS0 determines the CWS. Based on the comparison between the NACK ratio and the threshold, BS 0 may reduce the CWS, increase the CWS or maintain the CWS (e.g. keep the CWS unchanged) for subband 211c.

Following the method steps described in connection with FIG. 5 as discussed above, the ratio which is determined by introducing the scaling factor α, may help BS0 to adjust the CWS to relatively precisely reflect real channel quality or state of subband 211c. Accordingly, collision may be alleviated or mitigated. Moreover, throughput of the wireless network 1 of FIG. 1 may be improved in a relatively efficient way.

With respect to subband 211a, the NACK ratio can be calculated in the art as $$\frac{1+1}{1+1+1} = \frac{2}{3} \tag{13}$$

Wherein the feedback signal corresponding to UE1-TB is directly determined as one. However, due to the influence of the failed LBT on subband 211b and a collision on subband 211d associated with UE1-TB, the NACK ratio for subband 211a is calculated incorrectly, which cannot actually reflect the practical channel quality of subband 211a. When the threshold is 62%, according to the result (i.e., ⅔) of calculation in the art and ⅔ is larger than the threshold (i.e., 62%), BS will accordingly and incorrectly change the CWS for subband 211a to improve the throughput of the network, which will increase the delay improperly. However, according to some embodiments of the present application, a scaling factor α for the feedback signal corresponding to UE1-TB is used to substitute the calculated value "1" in the prior art, and the scaling factor α for the feedback signal corresponding to UE1-TB transmitted in subband 211a is calculated as $$\frac{\gamma}{n-p},$$

the NACK ratio for subband 211a is calculated as $$\frac{1+\alpha}{1+1+\alpha} = \frac{2+\gamma}{4+\gamma},$$

wherein n is equal to 3, p is equal to 1 and γ is a constant ranging from zero to one. Therefore, the maximum value of NACK ratio for subband 211a which adopts the scaling factor α is 60%, which is smaller than the threshold (i.e., 62%), and thus BS0 will not increase the CWS for the subband 211a. That is, BS 0 may maintain or reduce the CWS for subband 211a. Therefore, the NACK ratio using a scaling factor can correctly and effectively reflect the practical channel quality, which will ensure a fair and harmonious coexistence with other systems.

In accordance with other embodiments of the present application, referring to FIG. 5, in operation 501, BS 0 may receive feedback signals corresponding to UE0-CBG2, UE3-TB and UE2-TB transmitted in subband 211c as shown in FIG. 2B.

The feedback signals corresponding to UE0-CBG2, UE3-TB and UE2-TB may include ACK signal(s) and NACK signal(s). The ACK signal(s) may indicate data transmitted as part of TB or CBG was decoded successful. The NACK signal(s) may indicate a failure of decoding process of data transmitted as part of TB or CBG. In other words, BS 0 may receive a group of ACK feedback signals. In other words, BS 0 may receive a group of NACK feedback signals.

Referring back to FIG. 2B, BS0 may receive a group of feedback signals corresponding to UE0-CBG2 and UE2-TB indicating ACK and a feedback signal corresponding to UE3-TB indicating NACK.

In operation 502, if a feedback signal corresponding to transmission data in a form of TB (e.g. UE3-TB) indicates NACK, a feedback signal corresponding to data transmitted as part of TB (e.g. UE2-TB) indicates ACK and the amount p of subband with failed LBT operation associated with UE2-TB and/or UE3-TB is equal to zero, BS 0 determines the scaling factor $\alpha_1$ for the feedback signal corresponding to UE2-TB as $$\frac{1}{n1}$$

and determines the scaling factor $\alpha_2$ for the feedback signal corresponding to UE3-TB as $$\frac{\sigma}{1-(1-\sigma)^{n2}}.$$

Wherein "n1" is configured as the amount of subbands associated with the TB, i.e., regarding UE2-TB, n1 is equal to 1. "n2" is configured as the amount of subbands associated with the TB, i.e., regarding UE3-TB, n2 is equal to 2.

"σ" indicates probability of collision on one subband and ranges from zero to one. The scaling factor $\alpha_1$ for the feedback signal corresponding to UE2-TB is equal to $$\frac{1}{n1} = \frac{1}{1} = 1 \quad (14)$$

The scaling factor $\alpha_2$ for the feedback signal corresponding to UE3-TB is equal to $$\frac{\sigma}{1-(1-\sigma)^{n2}} = \frac{\sigma}{1-(1-\sigma)^2} = \frac{1}{2-\sigma} \quad (15)$$

In operation 503, assuming both the ACK feedback signal and the NACK feedback signal is given a weight of one, BS0 determines a ratio of NACK feedback signals based on the following, where the weight of NACK feedback signals corresponding to TBs (e.g. UE2-TB and UE3-TB) is replaced by or substituted with the scaling factors $\alpha_1$ and $\alpha_2$:

$$\frac{\alpha_2}{1+\alpha_1+\alpha_2} = \frac{\frac{\sigma}{1-(1-\sigma)^{n2}}}{1+\frac{1}{n1}+\frac{\sigma}{1-(1-\sigma)^{n2}}} = \frac{\frac{1}{2-\sigma}}{1+1+\frac{1}{2-\sigma}} = \frac{1}{5-2\sigma} \quad (16)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for subband 211c.

Following the method steps described in connection with FIG. 5 as discussed above, the ratio which is determined by introducing the scaling factor $\alpha$, may help BS 0 to adjust the CWS to relatively precisely reflect real channel quality or state of subband 211c. Accordingly, collisions may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

In accordance with some other embodiments of the subject application, some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to the virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG was decoded successful. On the other hand, the NACK signal(s) may indicate a failure of the decoding process of data transmitted as part of TB or CBG. In other words, BS0 may receive a group of ACK feedback signals. In other words, BS0 may receive a group of NACK feedback signals.

Referring back to FIG. 2B, on carrier 21, due to the failed LBT in subband 211b, data of CBG 1 may not be received by UE0, data of CBG1 may not be received by UE 4. Due to the collision in subband 211d, the feedback signal corresponding to UE0-CBG3 indicates NACK. The feedback signal corresponding to virtual UE4-TB is determined by feedback signals corresponding to UE4-CBG0 and UE4-CBG1 may indicate NACK.

BS 0 may receive a group of feedback signals corresponding to virtual UE0-TB and UE2-TB indicating ACK and a group of feedback signals corresponding to UE1-TB, UE3-TB and virtual UE4-TB indicating NACK.

In operation 502, if a feedback signal corresponding to data transmitted as part of TB (e.g. UE2-TB) indicates ACK, BS 0 determines the scaling factor $\alpha$ for the feedback signal corresponding to UE2-TB as one.

In operation 503, assuming both the ACK feedback signal and the NACK feedback signal is given a weight of one, BS 0 determines a ratio of NACK feedback signals based on the following, where the weight of NACK feedback signal corresponding to a TB (e.g. UE2-TB) is replaced by or substituted with the scaling factor $\alpha$:

$$\frac{1+1+1}{1+1+1+\alpha+1} = \frac{1+1+1}{1+1+1+1+1} = \frac{3}{5} \quad (17)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for carrier 21.

Following the method steps described in connection with FIG. 5, as discussed above, the ratio which is determined by introducing the scaling factor $\alpha$, may help BS0 to adjust the CWS to relatively precisely reflect real channel quality or state of carrier 21. Accordingly, collision may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

In accordance with some other embodiments of the subject application, some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, on carrier 21, due to the failed LBT in subband 211b, data of CBG 1 may not be received by UE0, data of CBG1 may not be received by UE4. Due to the collision in subband 211d, the feedback signal corresponding to UE0-CBG3 indicates NACK. The feedback signal corresponding to UE4-TB is determined by feedback signals corresponding to UE4-CBG0 and UE4-CBG1 may indicate NACK.

BS0 may receive a group of feedback signals corresponding to virtual UE0-TB and UE2-TB indicating ACK and a group of feedback signals corresponding to UE1-TB, UE3-TB and virtual UE4-TB indicating NACK.

In operation 502, if a feedback signal corresponding to data transmitted as part of TB (e.g. UE3-TB) indicates NACK and the amount p of subband with failed LBT operation associated with UE3-TB is equal to zero, BS0 determines the scaling factor α for the feedback signal corresponding to UE3-TB as one.

In operation 503, assuming both the ACK feedback signal and the NACK feedback signal are given a weight of one, BS0 determines a ratio of NACK feedback signals based on the following, where the weight of NACK feedback signal corresponding to TB (e.g. UE3-TB) is replaced by or substituted with the scaling factor α:

$$\frac{1+\alpha+1}{1+1+1+\alpha+1} = \frac{1+1+1}{1+1+1+1+1} = \frac{3}{5} \quad (18)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for carrier 21.

By the method 5 as discussed above, the ratio which is determined by introducing the scaling factor α, may help BS0 to adjust the CWS to relatively precisely reflect real channel quality or state of carrier 21. Accordingly, collision may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

In accordance with some other embodiments of the subject application, some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG is decoded successful. The NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, regarding carrier 21, due to the failed LBT in subband 211b, data of CBG 1 may not be received by UE0, data of CBG1 may not be received by UE 4. Due to the collision in subband 211d, the feedback signal corresponding to UE0-CBG3 indicates NACK. The feedback signal corresponding to UE4-TB is determined by feedback signals corresponding to UE4-CBG0 and UE4-CBG1 may indicate NACK.

BS0 may receive a group of feedback signals corresponding to virtual UE0-TB and UE2-TB indicating ACK and a group of feedback signals corresponding to virtual UE1-TB, UE3-TB and UE4-TB indicating NACK.

In operation 502, if a feedback signal corresponding to data transmitted as part of TB (e.g. UE1-TB) indicates NACK and the amount p of subband with failed LBT operation associated with UE1-TB is equal to one, BS0 determines the scaling factor α for the feedback signal corresponding to UE1-TB as a constant β.

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE3-TB) is replaced by or substituted with the scaling factor α:

$$\frac{1+\beta+1}{1+1+1+\beta+1} = \frac{2+\beta}{4+\beta} \quad (19)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for carrier 21.

Following the method steps described in connection with FIG. 5, as discussed above, the ratio which is determined by introducing the scaling factor α, may help BS0 to adjust the CWS to relatively precisely reflect real channel quality or state of carrier 21. Accordingly, collisions may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

In accordance with some other embodiments of the subject application, some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, regarding carrier 21, due to the failed LBT in subband 211b, data of CBG 1 may not be received by UE0, data of CBG 1 may not be received by UE4. Due to the collision in subband 211d, the feedback signal corresponding to UE0-CBG3 indicates NACK. The feedback signal corresponding to UE4-TB determined by feedback signals corresponding to UE4-CBG0 and UE4-CBG1 may indicate NACK.

BS0 may receive a group of feedback signals corresponding to virtual UE0-TB and UE2-TB indicating ACK and a group of feedback signals corresponding to virtual UE1-TB, UE3-TB and UE4-TB indicating NACK.

In operation 502, if a feedback signal corresponding to data transmitted as part of TB (e.g., UE1-TB) indicates NACK and the amount p of subband with failed LBT operation associated with UE1-TB is equal to one, BS0 determines the scaling factor α for the feedback signal corresponding to UE1-TB as a function of "n" and "p".

Wherein "n" is configured as the amount of subbands associated with the TB, i.e., regarding UE1-TB, n is equal to 3.

"p" is configured as the amount of subband with failed LBT operation associated with the TB, i.e., regarding UE1-TB, p is equal to 1.

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE1-TB) is replaced by or substituted with the scaling factor α:

$$\frac{1+\alpha+1}{1+1+1+\alpha+1} = \frac{2+\alpha}{4+\alpha} \tag{20}$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for carrier 21.

By the method 5 as discussed above, the ratio which is determined by introducing the scaling factor α, may help BS0 to adjust the CWS to relatively precisely reflect real channel quality or state of carrier 21. Accordingly, collision may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

In accordance with some other embodiments of the subject application, some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, regarding carrier 21, due to the failed LBT in subband 211b, data of CBG 1 may not be received by UE0, data of CBG1 may not be received by UE 4. Due to the collision in subband 211d, the feedback signal corresponding to UE0-CBG3 indicates NACK. The feedback signal corresponding to UE4-TB is determined by feedback signals corresponding to UE4-CBG0 and UE4-CBG1 may indicate NACK.

BS0 may receive a group of feedback signals corresponding to virtual UE0-TB and UE2-TB indicating ACK and a group of feedback signals corresponding to virtual UE1-TB, UE3-TB and UE4-TB indicating NACK.

In operation 502, if a feedback signal corresponding to transmission data in a form of TB (e.g., UE1-TB) indicates NACK and the amount p of subband with failed LBT operation associated with UE1-TB is equal to one, BS0 determines the scaling factor α for the feedback signal corresponding to UE1-TB as $1-(1-\sigma)^{n-p}$.

Wherein "n" is configured as the amount of subbands associated with the TB, i.e., regarding UE1-TB, n is equal to 3.

"p" is configured as the amount of subband with failed LBT operation associated with the TB, i.e., regarding UE1-TB, p is equal to 1.

"σ" indicates probability of collision on one subband and ranges from zero to one.

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE1-TB) is replaced by or substituted with the scaling factor α:

$$\frac{1+\alpha+1}{1+1+1+\alpha+1} = \frac{1+(1-(1-\sigma)^{n-p})+1}{1+1+1+(1-(1-\sigma)^{n-p})+1} = \tag{21}$$

$$\frac{1+(1-(1-\sigma)^{3-1})+1}{1+1+1+(1-(1-\sigma)^{3-1})+1} = \frac{3-(1-\sigma)^2}{5-(1-\sigma)^2}$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for carrier 21.

By the method 5 as discussed above, the ratio which is determined by introducing the scaling factor α, may help BS0 to adjust the CWS to relatively precisely reflect real channel quality or state of carrier 21. Accordingly, collisions may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

In accordance with some other embodiments of the subject application, some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG is decoded successful. On the other hand, the NACK signal(s) may indicate a failure of decoding process of data transmitted as part of TB or CBG. In other words, BS 0 may receive a group of ACK feedback signals. In other words, BS 0 may receive a group of NACK feedback signals.

Referring back to FIG. 2B, regarding carrier 21, due to the failed LBT in subband 211b, data of CBG 1 may not be received by UE0, data of CBG1 may not be received by UE4. Due to the collision in subband 211d, the feedback signal corresponding to UE0-CBG3 indicates NACK. The feedback signal corresponding to UE4-TB is determined by feedback signals corresponding to UE4-CBG0 and UE4-CBG1 may indicate NACK.

BS0 may receive a group of feedback signals corresponding to virtual UE0-TB and UE2-TB indicating ACK and a group of feedback signals corresponding to UE1-TB, UE3-TB and virtual UE4-TB indicating NACK.

In operation 502, if a feedback signal corresponding to data transmitted as part of TB (e.g., UE1-TB) indicates NACK and the amount p of subband with failed LBT operation associated with UE1-TB is equal to one, BS0 determines the scaling factor $\alpha$ for the feedback signal corresponding to UE1-TB as $1-(1-\sigma)^n$.

Wherein "n" is configured as the amount of subbands associated with the TB, i.e., regarding UE1-TB, n is equal to 3.

"$\sigma$" indicates probability of collision on one subband, i.e., the constant $\sigma$ ranges from zero to one.

In operation 503, assuming both the ACK feedback signal and the NACK feedback signal are given a weight of one, BS0 determines a ratio of NACK feedback signals based on the following, where the weight of NACK feedback signal corresponding to a TB (e.g. UE1-TB) is replaced by or substituted with the scaling factor $\alpha$:

$$\frac{1+\alpha+1}{1+1+1+\alpha+1} = \frac{1+(1-(1-\sigma)^n)+1}{1+1+1+(1-(1-\sigma)^n)+1} = \frac{1+(1-(1-\sigma)^3)+1}{1+1+1+(1-(1-\sigma)^3)+1} = \frac{3-(1-\sigma)^3}{5-(1-\sigma)^3} \quad (22)$$

In operation 504, BS0 compares the NACK ratio to a threshold.

In operation 505, BS0 determines the CWS. Based on the comparison between the NACK ratio and the threshold, BS0 may reduce the CWS, increase the CWS or maintain the CWS (e.g. keep the CWS unchanged) for carrier 21.

Following the method steps described in connection with FIG. 5, as discussed above, the ratio which is determined by introducing the scaling factor $\alpha$, may help BS0 to adjust the CWS to relatively precisely reflect real channel quality or state of carrier 21. Accordingly, collisions may be alleviated or mitigated. Moreover, throughput of the wireless network 1 in FIG. 1 may be improved in a relatively efficient way.

In accordance with other embodiments of the present application, referring to FIG. 5, in operation 501, BS0 may receive feedback signals corresponding to data transmitted in carrier 21 as shown in FIG. 2B.

Some wireless network may not support certain data transmission technique(s), for example but is not limited to, CBG data transmission technique. Accordingly, a CBG feedback signal may not be used to perform the method 5 as discussed above. Referring back to FIG. 4A, the feedback signal corresponding to the virtual UE4-TB may provide solution(s) in this circumstance.

Referring to FIG. 5, the feedback signals corresponding to virtual UE0-TB, UE1-TB, UE2-TB, UE3-TB and virtual UE4-TB may include ACK signal(s) and NACK signal(s). The ACK signal(s) may indicate that data transmitted as part of TB or CBG was decoded successful. On the other hand, the NACK signal(s) may indicate a failure of decoding process of data transmitted as part of TB or CBG. In other words, BS0 may receive a group of ACK feedback signals. In other words, BS0 may receive a group of NACK feedback signals.

Referring back to FIG. 2B, regarding carrier 21, due to the failed LBT in subband 211b, data of CBG 1 may not be received by UE0, data of CBG1 may not be received by UE 4. Due to the collision in subband 211d, the feedback signal corresponding to UE0-CBG3 indicates NACK. The feedback signal corresponding to UE4-TB is determined by feedback signals corresponding to UE4-CBG0 and UE4-CBG1 may indicate NACK.

BS0 may receive a group of feedback signals corresponding to UE2-TB indicating ACK and a group of feedback signal corresponding to UE1-TB and UE3-TB indicating NACK. The feedback signal corresponding to virtual UE0-TB may indicate ACK or NACK. The feedback signal corresponding to virtual UE4-TB may indicate ACK or NACK.

In operation 502, if a feedback signal corresponding to data transmitted as part of TB (e.g., UE1-TB) indicates NACK and the amount p1 of subband with failed LBT operation associated with UE1-TB is equal to one, BS0 determines the scaling factor $\alpha_1$ for the feedback signal corresponding to UE1-TB as one of a constant $\beta$, a function of "n1" and "p1", $1-(1-\sigma_1)^{n1}$ or $1-(1-\sigma_1)^{n1-p1}$.

Wherein "n1" is configured as the amount of subbands associated with the TB, i.e., regarding UE1-TB, n1 is equal to 3. "p1" is configured as the amount of subband with failed LBT operation associated with the TB, i.e., regarding UE1-TB, p1 is equal to 1. "$\sigma_1$" indicates probability of collision on one subband, i.e., the constant $\sigma_1$ ranges from zero to one.

if a feedback signal corresponding to data transmitted as part of TB (e.g., UE2-TB) indicates ACK, BS0 determines the scaling factor $\alpha_2$ for the feedback signal corresponding to UE2-TB as one.

if a feedback signal corresponding to data transmitted as part of TB (e.g., UE3-TB) indicates NACK and the amount p2 of subband with failed LBT operation associated with UE3-TB is equal to zero, BS0 determines the scaling factor $\alpha_3$ for the feedback signal corresponding to UE3-TB as one.

In operation 503, assuming both the ACK feedback signal and the NACK feedback signal are given a weight of one, BS0 determines a ratio of NACK feedback signals based on the following, where the weight of NACK feedback signals corresponding to TBs (e.g. UE1-TB, UE2-TB and UE3-TB) is replaced by or substituted with the scaling factors $\alpha_1$, $\alpha_2$ and $\alpha_3$:

$$\frac{f_0 + \alpha_1 + \alpha_3 + f_4}{1 + \alpha_1 + \alpha_2 + \alpha_3 + 1} \quad (23)$$

Wherein $f_0=1$ if the feedback signal corresponding to virtual UE0-TB indicates ACK, $f_0=0$ otherwise. Wherein $f_4=1$ if the feedback signal corresponding to virtual UE4-TB indicates ACK, $f_4=0$ otherwise.

In operation 504, BS0 compares the NACK ratio to a threshold.

In operation 505, BS0 determines the CWS. Based on the comparison between the NACK ratio and the threshold, BS 0 may reduce the CWS, increase the CWS or maintain the CWS (e.g. keep the CWS unchanged) for carrier 21.

Following the method steps described in connection with FIG. 5, as discussed above, the ratio which is determined by introducing the scaling factors $\alpha_1$, $\alpha_2$ and $\alpha_3$ may help BS0 to adjust the CWS to relatively precisely reflect real channel quality or state of carrier 21. Accordingly, collision may be alleviated or mitigated. Moreover, throughput of the wireless network 1 in FIG. 1 may be improved in a relatively efficient way.

In accordance with some embodiments of the present application, the scaling factor ranges from 0 to 1.

Figure 6:
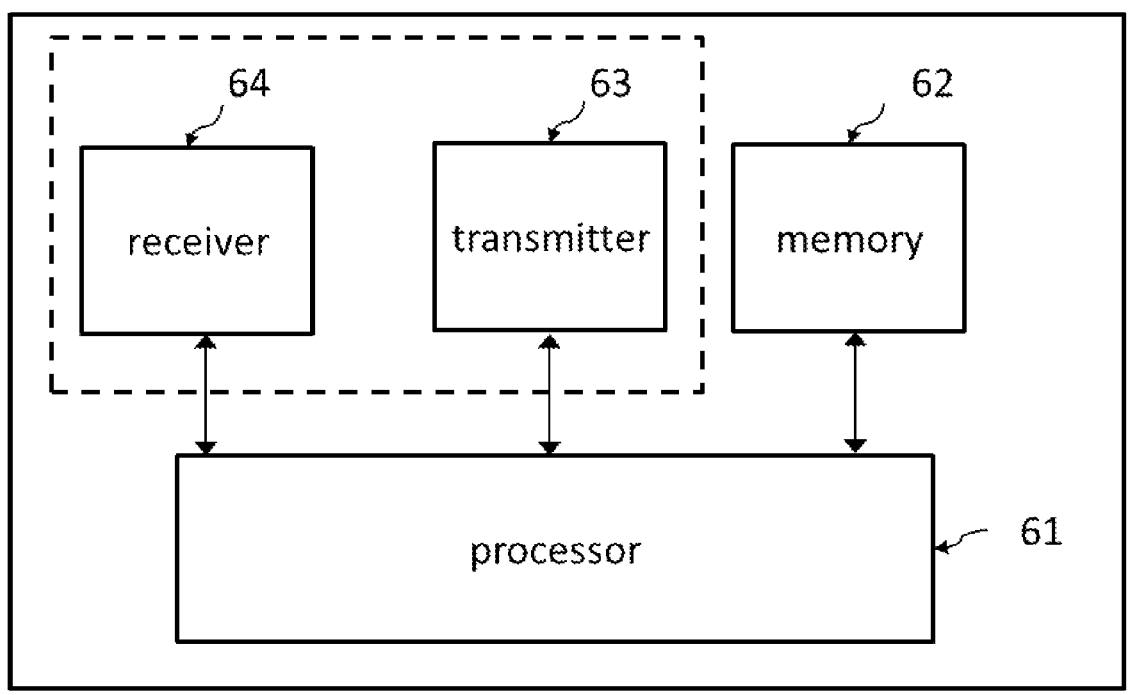
FIG. 6 illustrates an apparatus of CWS adjustment in accordance with some embodiments of the subject application.

FIG. 6 illustrates an apparatus 6 of CWS adjustment in accordance with some embodiments of the subject application.

As shown in FIG. 6, the apparatus 6 may include a processor 61. The apparatus 6 may further include a memory 62. The apparatus 6 may further include a transmitter 63. The apparatus 6 may further include a receiver 64. The memory 62 has computer program code stored therein. The processor 61 is configured to be coupled to the memory 62. The processor 62 is configured to be coupled to the receiver 64. The processor 64 is configured to be coupled to the transmitter 63. It is contemplated that the apparatus 6 may include more memories, receiver, transmitter and processors. In some embodiments, the apparatus 6 may be a BS. BS may operate, for example but is not limited to, based on the standard protocol of LTE, LTE-A, NR, LTE-U, LTE LAA, NR-U, 3GPP, Wi-Fi, WiGig or other suitable protocol(s).

In some embodiments, the receiver 64 and the transmitter 63 are integrated into a single device, such as a transceiver. In certain embodiments, the apparatus 6 may further include an input device, a memory, and/or other components.

In some embodiments, the memory may have stored thereon computer program code to cause a processor to implement the method with respect to BS as describe above. For example, the memory 62 and the computer program code are configured, with the processor 61, cause the apparatus 6 to perform the operations with respect to the BS depicted in FIGS. 1-5.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The following is what is claimed:

1. A method performed by a base station, comprising:
    receiving a first group of feedback signals from a user equipment (UE) indicating a first state corresponding to data transmitted in a first band used by a carrier, the first group of feedback signals comprising at least one first feedback signal;
    receiving a second group of feedback signals from the UE indicating a second state corresponding to data transmitted in the first band used by the carrier;
    determining a first scaling factor $\alpha$ for one of the at least one first feedback signal;
    determining a ratio of the first group of feedback signals to the first group of feedback signals and the second group of feedback signals; and
    comparing the ratio to a threshold to determine a contention window size of the first band for a contention window;
    generating a random back-off counter within the contention window, and adjusting the contention window size of a transmitter of the base station, based on the ratio;
    wherein the first scaling factor $\alpha$ substitutes a weight of the one of the at least one first feedback signal in determination of the ratio of the first group of feedback signals to the first group of feedback signals and the second group of feedback signals.

2. The method of claim 1, further comprising determining a second scaling factor for a second feedback signal in the second group of feedback signals, wherein the second scaling factor is determined as one, wherein the second scaling factor substitutes a weight of the second feedback signal in determination of the ratio of the first group of feedback signals to the first group of feedback signals and the second group of feedback signals.

3. The method of claim 2, further comprising determining a second scaling factor for another one of the at least one first feedback signal in the first group of feedback signals, wherein the second scaling factor is determined as one, and the second scaling factor substitutes a weight of the another one of at least one first feedback signal in determination of the ratio of the first group of feedback signals to the first group of feedback signals and the second group of feedback signals.

4. The method of claim 3, wherein the first group of feedback signals comprises at least one third feedback signal different from the at least one first feedback signal.

5. The method of claim 4, wherein the second group of feedback signals comprises at least one fourth feedback signal different from the second feedback signal.

6. The method of claim 5, wherein the at least one first feedback signal is determined based on the at least one third feedback signal.

7. The method of claim 5, wherein the at least one first feedback signal is determined based on the at least one fourth feedback signal.

8. The method of claim 5, wherein the at least one first feedback signal is determined based on the at least one third feedback signal and the at least one fourth feedback signal.

9. The method of claim 5, wherein the second group of feedback signals is determined based on the at least one third feedback signal.

10. The method of claim 5, wherein the second group of feedback signals is determined based on the at least one fourth feedback signal.

11. The method of claim 5, wherein the second group of feedback signals is determined based on the at least one third feedback signal and the at least one fourth feedback signal.

12. The method of claim 1, wherein a transport block of data is transmitted via a number of n bands including the first band on the carrier, and wherein the first scaling factor $\alpha$ is determined based on an amount p of second band(s) of the number of n bands, and a listen-before-talk Listen Before Talk (LBT) operation indicates failure in the second band(s) of the number of n bands.

13. The method of claim 12, wherein the first scaling factor $\alpha$ is determined based on a function of the number of n bands, the amount p of second band(s) of the number of n bands and a first predetermined value q if a second feedback signal, which is associated with the transport block of data, in the second group of feedback signals is received.

14. The method of claim 12, wherein the first scaling factor $\alpha$ is further determined based on a constant $\sigma$ if the amount p of second band(s) of the number of n bands is equal to or greater than one.

15. The method of claim 14, wherein the constant $\sigma$ is associated with probability of collision in one of the number of n bands.

16. The method of claim 12, wherein the first scaling factor $\alpha$ is further determined based on a constant $\sigma$ if the amount p of second band(s) of the number of n bands is equal to zero.

17. The method of claim 12, wherein the first scaling factor $\alpha$ is further determined based on a function of the number of n bands, the amount p of second band(s) of the number of n bands and a value $\gamma$ if the amount p of second band(s) of the number of n bands is equal to or greater than one.

18. The method of claim 12, wherein the first scaling factor $\alpha$ is further determined based on the number of n bands if the amount p of second band(s) of the number of n bands is equal to zero.

19. The method of claim 1, wherein the first scaling factor ranges from 0 to 1.

\* \* \* \* \*